United States Patent Office 3,009,972
Patented Nov. 21, 1961

3,009,972
DIMERIZATION OF OLEFINS
William K. Johnson, Dayton, Ohio, assignor to Monsanto Chemical Company, St. Louis, Mo., a corporation of Delaware
No Drawing. Filed Sept. 25, 1959, Ser. No. 842,196
11 Claims. (Cl. 260—683.15)

This invention relates to the dimerization of internal olefins.

An object of this invention is the dimerization of olefinic hydrocarbons having at least 3 carbon atoms in the molecule. Another object of this invention is to provide a catalyst system for use in the dimerization of olefinic hydrocarbons. A special object of this invention is to provide a catalyst and a method for the dimerization of olefins having an internal double bond. According to the invention, unsaturated organic hydrocarbons having at least 3 carbon atoms in their molecules are dimerized by heating such hydrocarbons to a temperature of about 100 to 250° C. in the presence of a catalyst comprising an organoborane and an organo compound of a metal selected from the group consisting of aluminum, gallium, indium, beryllium, magnesium, and zinc.

Certain procedures have been described in the art for dimerizing olefins. These procedures are generally restricted to α-olefins, either in their particular teaching, or as a practical matter since these methods or catalysts are very inefficient with internal olefins. For example, U.S. 2,695,327, Nov. 23, 1954, teaches the use of certain organo compounds of aluminum, gallium, indium, or beryllium as dimerization activators for either terminal olefins or olefins having an intermediate double bond. However, these activators dimerize olefins having an intermediate or internal double bond extremely slowly.

By the practice of my invention, olefins of the general formula

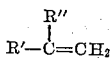

$$R'-\overset{R''}{\underset{|}{C}}=CH_2$$

are readily converted to olefin dimers. In this formula R' is an aliphatic hydrocarbon radical having from 2 to 10 carbon atoms and R'' can be either hydrogen or an aliphatic hydrocarbon radical of 1 to about 10 carbon atoms and the sum of the carbon atoms in R'+R'' is not more than 12.

My invention is applicable in the dimerization of 1-olefins. Whereas, in normal practice, activators of the type described in U.S. 2,695,327, when used to dimerize 1-olefins, tend to isomerize part of the 1-olefin to internal olefin which is dimerized very slowly, my catalyst produces higher than expected yields of dimers under identical reaction conditions.

The instant invention finds particular applications in the dimerization of the group of aliphatic olefinic hydrocarbons known as internal olefins. By internal olefins I mean to include the unsaturated hydrocarbons wherein the double bond is not connected to a terminal carbon atom. According to my invention, dimers can be prepared from olefins such as 2-butene, 2-methyl-2-butene, 2-pentene, 3-pentene, 2-methyl-2-pentene, 2-methyl-3-pentene, 3-methyl-2-pentene, 2-hexene, 2-methyl-2-hexene, 2-methyl-3-hexene, 2-methyl-4-hexene, 3-methyl-2-hexene, 3-methyl-3-hexene, 3-methyl-4-hexene, 2-heptene, 3-heptene, 2-octene, 3-octene, and 4-octene, from the straight-chain α-olefins, e.g., butene-1, pentene-1, hexene-1, heptene-1, octene-1 nonene-1, decene-1, and dodecene-1, and from olefins such as 2-methylpentene, 2-ethylhexene, and 2-butyloctene.

I prefer to call the combination of compounds, used to promote the dimerization of olefins, catalysts even though they actually participate to a small extent in the overall reaction. They can be considered as catalysts for the reason that small quantities are effective in dimerizing proportionally great quantities of olefins. The catalysts effective in the dimerization of olefins according to my invention are obtained by combining a borane with an organo compound of a metal selected from the group consisting of aluminum, gallium, indium, beryllium, magnesium and zinc. The organo metal compound is further defined hereinbelow with reference to organoaluminum compounds, although it will be understood that the other metals, gallium, indium, beryllium, magnesium, or zinc, can be used in this invention in place of the aluminum in the organo metal compound.

The organoaluminum compounds suitable as a catalyst component can have the general formula $AlR_3$, $AlR_2H$, $AlRH_2$, or $AlH_3$, where R is an alkyl radical, aryl radical or alkaryl radical. Any compound that in contact with the olefin to be dimerized forms an aluminum trialkyl can be successfully used. In certain instances, it is preferred that R have the same carbon skeleton as the olefin to be dimerized to minimize by-product formation during the reaction. One preferable radical is the isobutyl radical for the reason that isobutene is a product formed by interaction of aluminum triisobutyl and an olefin, and this olefin can not dimerize without carbon atom migration, under the reaction conditions employed. The formula of the organic compound of a metal can be written as $MeR_{n-m}H_m$, where Me is the metal aluminum, gallium, indium, beryllium, magnesium or zinc, R is the organo radical selected from alkyl, aryl or alkaryl monovalent hydrocarbon radicals, n is the valence of the metal and m is an integer from 0 to 3. Suitable compounds include $Al(C_4H_9)_3$, $Ga(C_4H_9)_2H$, $In(C_2H_5)_3$, $Be(C_4H_9)_2$, $Mg(C_3H_7)_2$, $Zn(C_6H_{13})_2$, $Al(C_8H_{17})_2H$, $Ga(C_6H_5)_3$, $Be(C_{12}H_{25})_2$, $Mg(C_6H_5)_2$, $Al(C_6H_5)H_2$, $Al(C_6H_5)_3$, $Mg(C_4H_9)_2$, $In(C_6H_5)_3$, $Zn(C_2H_5)_2$, $AlH_3$, $BeH_2$, $Mg(CH_3)_2$, and the like.

The second catalyst component is a borane. This can be borane, trialkylboranes, or any boron compound which reacts under the dimerization reaction conditions to give trialkylboranes, e.g., diborane, triborane, monoalkylboranes, dialkyboranes, tertiary amino complexes of borane such as $BH_3 \cdot (C_4H_9)_3N$, $BH_3 \cdot C_5H_5N$, etc. When a trialkylborane is used as a catalyst component, I have found that trimethylborane is extremely sluggish in its activity, while the triethylborane is sluggish; therefore, I prefer to use trialkylboranes where the alkyl radical is a monovalent hydrocarbon radical having 3 or more carbon atoms in the alkyl chain.

While the expression dimerization is usually understood to mean the formation of a dimer of two like molecules of unsaturated hydrocarbon, within the scope of my invention I can form the dimer of two unlike unsaturated hydrocarbon molecules; thus, a single unsaturated hydrocarbon can form a dimer with itself or two different unsaturated hydrocarbons can be dimerized. It will be understood, of course, that when two different unsaturated hydrocarbons are dimerized in accordance with my invention a mixture of products is obtained. If, for example, olefin A and olefin B are dimerized then the products produced will consist of AA plus AB plus BB.

My invention does not depend upon a critical temperature range for operability; however, I prefer to conduct the dimerization within a temperature range that will not prolong the reaction time. The reaction can be carried out at temperatures from about 100° up to about 275° C., but I normally prefer to operate between about 150° and 250° C.

Pressures developed at the selected temperature, i.e., autogenous, can be used for the practice of this invention. I can pressurize the reaction to considerably higher pressures, however, by the use of excess quantities of the olefin reactant to obtain higher yields and, of course, higher yields per cubic foot of reactor space. Thus, if desired, the dimerization can be conducted at or about 1000 atmospheres or even 2500 atmospheres or more if desired.

I have conducted the dimerization reactions in a batchwise system for convenience in determining yields and conversion data but it will be understood that I can operate conveniently in a continuous operation whereby unconverted starting olefin is separated by fractionation and recycled to the reactor, while recovering the olefin dimer. When the dimerization is conducted in a continuous reaction very small proportions of catalyst constituents are added periodically along with the olefin monomer feed stream to maintain the conversion to dimer at a comparatively high level.

The mole ratio of the organoborane to the organo metal compound can be varied from about 50 to 1 to about 1 to 50. The mole ratio of olefin to be dimerized to the sum of the moles of catalyst constituents can be as high as 1000 to 1 or even higher and, naturally, lower ratios can be used if desired, say for example, 20 to 1, or 100 to 1.

While I do not intend to be limited to any particular theory as to the mechanism of operation of my catalysts, it is believed that the 2-component system operates in a rapid step-wise manner. The organoborane promotes the isomerization of an internal olefin to a terminal olefin, or, conversely, the isomerization of a starting α-olefin to internal olefins is in effect reduced. For this reason the amount of organoborane making up part of the catalyst can be varied, in relation to the organo metallic compound, depending upon the olefin being dimerized, e.g., smaller proportions of trialkylborane are required to retard the isomerization of terminal olefins than are required if isomerization is to be a desired reaction. More specifically, if I wish to dimerize 1-decene by the practice of my new and novel procedure I prefer to use about 0.1 to 5.0 moles organo metallic compound to 1.0 mole organoborane; however, if I wish to dimerize 2-decene, or 3-decene by my procedure, I prefer to use about 0.05 to 2.0 moles organo metallic compound to 1.0 mole of the organoborane.

It is believed that the second phase in the synthesis of olefinic dimers involves an association of the terminal olefin with the organometallic portion of the catalyst to form an intermediate which then becomes stabilized by shifting of an alkyl group to form the olefin dimer product.

In my work on the dimerization of various olefins a great many different runs have been made. Certain representative data are set forth in the following examples which present certain properties of selected materials. These examples are set forth for the purpose of more fully describing the present invention and should not be considered to limit the invention to the specific details shown.

*Example 1.—Preparation of tri-n-propylborane*

Trialkylboranes suitable for use as a catalyst component in the practice of my invention can be prepared according to the general equation:

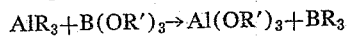

where R and R' are alkyl groups which may be the same or different. Normally the trialkylaluminum and the alkyl borate are employed in stoichiometric quantities, or a slight excess of trialkylaluminum is employed to drive the reaction to completion.

To a thoroughly dried reactor was charged 54.5 g. (0.29 mole) triisopropyl borate. The reactor was fitted with a dropping funnel, mechanical stirrer, thermometer and Dry Ice condenser. Tri-n-propylaluminum, 45.0 g. (0.29 mole) was added dropwise at a reaction temperature from −10 to 20° C. Propylene gas was passed into the reactants to insure that conversion to tri-n-propylborane would be complete in case the tri-n-propylaluminum was contaminated with di-n-propylaluminum hydride. The mixture was then heated at reflux for one hour and ten minutes. During this time the reaction temperature increased from 160° to 176° C. Upon fractionation a 95% yield of pure tri-n-propylborane, boiling range 53–60° C./16 mm., was obtained.

*Example 2.—Preparation of triisobutylborane*

A thoroughly dried glass reactor fitted with a reflux condenser and a dropping funnel was charged with triisopropyl borate (17.0 g.; 0.09 mole) and triisobutylaluminum (19.9 g.; 0.10 mole), was then added to the reactor at a dropwise rate in a period of ½ hour. An exothermic reaction was noted during the addition. The resulting clear liquid reaction mixture was then heated to 140 to 180° C. for 21 hours to force the reaction to completion. Triisobutylborane was recovered by fractionation at reduced pressure. The weight of product was 13.0 g., boiling at 72 to 80° C. at 12 mm.

*Example 3.—Dimerization of hexene-2*

A dry 300 mm. stainless steel autoclave was charged with 75.0 g. hexene-2 of 95 mole percent minimum purity, marketed by the Phillips Petroleum Co., 9.0 ml. tri-n-butylborane and 4.0 g. triisobutylaluminum. The autoclave was sealed and then heated at 195 to 200° C. for 24 hours in a rocking mechanism, and then cooled to room temperature. The reaction products were diluted with an equal volume of ethyl ether and extracted with 125 ml. portion of 5% aqueous sulfuric acid followed by two extractions with 25 ml. portions of 10% aqueous sodium hydroxide solution. The ether solution was washed with water and dried over magnesium sulfate. Upon distillation, 14.0 g. of 2-butyloctene-1 were recovered boiling at 90 to 93° C. at 15 mm. Hg, having a refractive index of $n_D^{25}$ 1.4299.

This run illustrates that the internal olefin, hexene-2, was converted to 2-butyloctene-1 in 19% conversion.

*Example 4.—Control run: dimerization of hexene-2 without added trialkylborane catalyst*

A dried 300 ml. stainless steel autoclave was charged with 75.0 g. of Phillips hexene-2 and 4.0 g. triisobutylaluminum. The autoclave was sealed and then placed in a rocking mechanism and heated at 195 to 200° C. for 24 hours. The reaction mixture was worked-up as in the preceding example. Upon fractionation 5.0 g. of 2-butyloctene-1 boiling at 90 to 94° C. at 15 mm., $n_D^{25}$ 1.4300 were recovered.

In this example the conversion of the internal olefin to 2-butyloctene-1 was 6.5%. Comparison of the result from Example 3 with Example 4 shows a marked increase in dimerization obtained with the use of the trialkylborane catalyst in conjunction with the trialkylaluminum compound.

*Example 5*

Dodecylbenzene was prepared by the aluminum chloride catalyst alkylation of benzene using the 2-butyloctene-1 produced according to the procedure of Example 3. After sulfonation with 100% sulfuric acid and subsequent neutralization with sodium hydroxide, the sodium dodecylbenzenesulfonate was submitted to biological degradation studies. In a laboratory activated-sewage sludge test simulating conditions used in sewage disposal plants, an aqueous solution of surface active agent is exposed to a concentrated suspension of organisms. The test is carried out in a Warburg apparatus so that oxygen pick-up can be measured. In this test sodium dodecylbenzenesulfonate derived from tetrapropylene is particularly resistant to biological degradation. The alkylbenzenesulfonate derived from 2-butyloctene-1 was as readily degraded as the alkylbenzenesulfonate derived from either 1-dodecene or from monochloro-n-dodecane. As demonstrated by these qualitative tests, the practice of my invention can lead to olefins of particular significance and applicability for the preparation of biodegradable surface active agents.

*Example 6.—Dimerization of 4-methylpentene-1*

A charge of 160 g. 4-methylpentene-1 and 10 ml. triisobutylaluminum were heated in an autoclave at 195–200° C. for 26 hours. The products were washed with 50 ml. of 10% aqueous sulfuric acid and the organic layer separated and dried over anhydrous MgSO$_4$. Upon fractionation 40 g. of dimer, boiling range 80–81° C./17 mm., $n_D^{25}$ 1.4258, were obtained. By vapor phase chromatography it was determined that this fraction was essentially homogeneous 2-isobutyl-6-methylheptene.

*Example 7.—Dimerization of 2-methylpentene-1*

A small stainless steel autoclave was charged with 110.0 g. 2-methylpentene-1 which had been previously distilled from triisobutylaluminum, 4.0 g., was added to the autoclave followed by pyridine-borane, 8.5 g., which was charged in a glass tube open at one end. After the autoclave was sealed the catalytic reagents were mixed by inverting the autoclave. There was no noticeable heat of reaction. The reactants were maintained at 195–200° C. in an electrically heated rocking mechanism for 24 hours. After cooling, the reactants were poured from the autoclave and washed with aqueous sulfuric acid followed by water and then dried over anhydrous magnesium sulfate. Upon fractionation, after unreacted 2-methylpentene-1 had been distilled, a fraction was obtained boiling at 83–85° C. at 20 mm., $n_D^{25}$ 1.4248, corresponding to dimer. Examination of this dimer fraction by vapor phase chromatography showed that this dimer fraction was identical to that obtained by the dimerization of 41methylpentene-1 obtained in Example 6 above.

This example illustrates the unexpected activity of my catalyst in a preparation of olefin dimers. Trialkylaluminum alone has little or not activity in dimerizing olefins of the 1,1-disubstituted ethylene type. However, mixtures of an organo metallic compound and a borane can be used to prepare dimers from these type olefins in high conversion. This run offers additional evidence that the dimerization, in the presence of my catalyst combinations, proceeds, probably via an isomerization step followed by dimerization.

This example shows how propylene tetramers of particular interest for the preparation of detergent alkylate can be prepared by the use of my novel catalyst combinations. Propylene can be converted to 2-methylpentene-1 in high yield, and then in the same reactor, preferably after a fractionation step, the propylene tetramer prepared.

While the invention has been described with particular reference to several preferred embodiments thereof, it will be appreciated that variations in the details given herein can be effected without departing from the invention in its broadest aspects. As has been pointed out above, the description of various procedures of demerization are generally applicable to all of the olefin monomers coming within the broad scope of my invention.

I claim:

1. In the process for the dimerization of olefinic hydrocarbons having at least 3 carbon atoms in the molecule, the improvement which comprises contacting said olefinic hydrocarbon with a catalyst comprising a borane and an organo compound of a metal selected from the group consisting of aluminum, gallium, indium, beryllium, magnesium, and zinc.

2. In the process of preparing olefinic dimers from olefinic hydrocarbons having at least 3 carbon atoms in the molecule, the improvement which comprises contacting said olefinic hydrocarbon with a catalyst comprising an organoborane and an organometallic compound of the formula MeR$_{n-m}$H$_m$, where Me is a metal selected from the group consisting of aluminum, gallium, indium, beryllium, magnesium, and zinc, R is a monovalent hydrocarbon radical, $n$ is the valence of the metal, Me, and $m$ is an integer from 0 to 3.

3. A process for converting an olefin of the formula

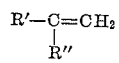

where R' is an aliphatic hydrocarbon radical of 2 to 10 carbon atoms, R" is selected from the group consisting of hydrogen and aliphatic hydrocarbon radicals, and the sum of the carbon atoms in R and R' together is not more than 12, to the corresponding olefin dimer which comprises contacting said olefin with a catalyst comprising a borane and an organometallic compound of the formula MeR$_{n-m}$H$_m$, where Me is a metal selected from the group consisting of aluminum, gallium, indium, beryllium, magnesium, and zinc, R is a monovalent hydrocarbon radical, $n$ is the valence of the metal Me, and $m$ is an integer from 0 to 3.

4. The process for the preparation of an olefinic dimer which comprises contacting an aliphatic olefin, containing an internal double bond and from 4 to 12 carbon atoms in the molecule, with a catalyst comprising a borane and an organo compound of a metal selected from the group consisting of aluminum, gallium, indium, beryllium, magnesium and zinc.

5. The process of claim 4 wherein the catalyst comprises 0.1 to 5.0 moles organo metallic compound for 1.0 mole of a borane.

6. The process of claim 5, wherein the catalyst comprises an aluminum compound selected from the group consisting of aluminum alkyls and aluminum alkyl hydrides and the borane is a trialkylborane wherein the alkyl group is a monovalent hydrocarbon radical having at least 3 carbon atoms in the alkyl chain.

7. The process for the preparation of an olefinic dimer which comprises contacting an aliphatic olefin containing from 3 to 12 carbon atoms in the molecule with a catalyst comprising an organo compound of a metal selected from the group consisting of aluminum, gallium, indium, beryllium, magnesium, and zinc and a trialkylborane wherein said alkyl radical has at least 3 carbon atoms.

8. The process of claim 7, wherein the catalyst comprises triisobutylaluminum and tri-n-propylborane.

9. The process of claim 7, wherein the catalyst comprises triisobutylaluminum and triisobutylborane.

10. The process of claim 7, wherein the catalyst comprises 0.1 to 5.0 moles of an organo aluminum compound for 1.0 mole of the trialkylborane.

11. The process for the preparation of an olefinic dimer which comprises contacting an aliphatic olefin containing from 3 to 12 carbon atoms in the molecule with a catalyst comprising an organo compound of a metal selected from the group consisting of aluminum, gallium, indium, beryllium, magnesium, and zinc, a trialkylborane wherein said alkyl radical has at least 3 carbon atoms, and a tertiary amine, and isolating the olefinic dimer therefrom.

References Cited in the file of this patent

UNITED STATES PATENTS 2,840,551    Field et al. _____ June 24, 1958

FOREIGN PATENTS 1,116,132    France _____ May 4, 1956